United States Patent
Inoue et al.

(10) Patent No.: US 11,773,958 B2
(45) Date of Patent: Oct. 3, 2023

(54) COOLING SYSTEM FOR VEHICLE

(71) Applicant: TOYOTA JIDOSHA KABUSHIKI KAISHA, Toyota (JP)

(72) Inventors: Junichi Inoue, Toyota (JP); Masato Iijima, Nukata-gun (JP); Takahiro Kondo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/582,604

(22) Filed: Jan. 24, 2022

(65) Prior Publication Data

US 2022/0235859 A1  Jul. 28, 2022

(30) Foreign Application Priority Data

Jan. 27, 2021 (JP) ................................ 2021-011552

(51) Int. Cl.

| | |
|---|---|
| F16H 57/04 | (2010.01) |
| F01P 5/04 | (2006.01) |
| F01P 11/08 | (2006.01) |
| F01P 7/04 | (2006.01) |
| F16H 57/02 | (2012.01) |

(52) U.S. Cl.
CPC ............ *F16H 57/0415* (2013.01); *F01P 5/04* (2013.01); *F01P 7/044* (2013.01); *F01P 11/08* (2013.01); *F16H 2057/02047* (2013.01)

(58) Field of Classification Search
CPC .............. F01P 3/12; F16H 2057/02047; F16H 2063/508

See application file for complete search history.

(56) References Cited

U.S. PATENT DOCUMENTS

| | | | |
|---|---|---|---|
| 2013/0217539 A1* | 8/2013 | Natsume ............... | B60W 10/08 477/52 |
| 2014/0277890 A1* | 9/2014 | Ideshio .................. | B60K 6/547 180/65.265 |
| 2018/0119597 A1* | 5/2018 | Styron ..................... | F01P 7/165 |
| 2020/0156617 A1* | 5/2020 | Takagi ..................... | F01N 9/00 |
| 2021/0078578 A1* | 3/2021 | Meyer .................... | B60K 6/547 |

FOREIGN PATENT DOCUMENTS

JP  2010-196852 A  9/2010

* cited by examiner

*Primary Examiner* — Long T Tran

(74) *Attorney, Agent, or Firm* — Oblon, McClelland, Maier & Neustadt, L.L.P.

(57) ABSTRACT

A cooling system for a vehicle that includes a temperature detection device for detecting a temperature related to a power transmission apparatus. The cooling system includes a cooling fan and an electronic control apparatus including a load limiting portion configured, when the detected exceeds a limit temperature value, to limit a load applied to the power transmission apparatus. The electronic control apparatus is configured to determine whether the detected temperature is equal to or higher than a fan-cooling temperature value that is lower than the limit temperature value, and to control rotation of the cooling fan, such that the cooling fan is rotated when the detected temperature is not lower than the fan-cooling temperature value, and such that a rotational speed of the cooling fan is higher when a temperature of the power transmission apparatus is high, than when the temperature of the power transmission apparatus is low.

15 Claims, 7 Drawing Sheets

|  | ENGINE ROTATIONAL SPEED NE (rpm) ||||||||
|---|---|---|---|---|---|---|---|---|
|  | 1000 | ... | 1999 | 2000 | ... | 2500 | ... | 3000 | ... |
| DUTY RATIO Dt (%) | 0 | ... | 0 | 60 | ... | 64 | ... | 68 | ... |

COOLING SYSTEM FOR VEHICLE

This application claims priority from Japanese Patent Application No. 2021-011552 filed on Jan. 27, 2021, the disclosure of which is herein incorporated by reference in its entirety.

FIELD OF THE INVENTION

The present invention relates to a cooling system for a vehicle, and more particularly to a cooling system including a load limiting portion configured to limit a load when a temperature of a power transmission apparatus exceeds a predetermined limit temperature value.

BACKGROUND OF THE INVENTION

There is known a vehicle cooling system including (a) a temperature detection device configured to detect a temperature related to a power transmission apparatus and (b) an electric control apparatus including a load limiting portion configured to limit a load applied to the power transmission apparatus when the temperature detected by the temperature detection device exceeds a predetermined limit temperature value. A system disclosed in JP-2010-196852A is an example of such a system. In the disclosed system, a high-load operation is inhibited when a temperature (T/M oil temperature) of a transmission as the power transmission apparatus is not lower than a predetermined threshold value (see paragraph [0022] in the Japanese Patent Application Publication).

SUMMARY OF THE INVENTION

However, when the load applied to the power transmission apparatus is limited, an original performance of the vehicle related to the power transmission apparatus could be compromised. With the load applied to the power transmission apparatus being limited, a fuel economy performance and a drivability such as acceleration performance and driving feeling could be reduced, for example, where the power transmission apparatus is a transmission or any other apparatus related to a drive power.

The present invention was made in view of the background art described above. It is therefore an object of the present invention to suppress transition to limitation of a load applied to a power transmission apparatus, by cooling the power transmission apparatus before a temperature of the power transmission apparatus reaches a limit temperature value.

The object indicated above is achieved according to the following aspects of the present invention.

According to a first aspect of the invention, there is provided a cooling system for a vehicle that includes a power transmission apparatus and a temperature detection device configured to detect a temperature related to the power transmission apparatus, the cooling system comprising: a cooling fan configured to cool the power transmission apparatus; and an electronic control apparatus including a load limiting portion configured, when the temperature detected by the temperature detection device exceeds a limit temperature value, to limit a load applied to the power transmission apparatus, wherein the electronic control apparatus includes a fan-rotation control portion configured to determine whether the detected temperature is equal to or higher than a fan-cooling temperature value that is lower than the limit temperature value, and to control rotation of the cooling fan, such that the cooling fan is rotated when the detected temperature is equal to or higher than the fan-cooling temperature value, and such that a rotational speed of the cooling fan is higher when a temperature of the power transmission apparatus is high, than when the temperature of the power transmission apparatus is low, namely, the rotational speed of the cooling fan is increased with increase of the temperature of the power transmission apparatus. It is preferable that the temperature of the power transmission apparatus is reduced by rotation of the cooling fan. However, by the rotation of the cooling fan, the temperature of the power transmission apparatus does not necessarily have to be reduced as long as increase of the temperature of the power transmission apparatus is suppressed.

According to a second aspect of the invention, in the cooling system according to the first aspect of the invention, the fan-rotation control portion is configured to control the rotation of the cooling fan, based on the detected temperature or a physical quantity that influences the temperature of the power transmission apparatus, such that the rotational speed of the cooling fan is higher when the temperature of the power transmission apparatus is high, than when the temperature of the power transmission apparatus is low, namely, the rotational speed of the cooling fan is increased with increase of the temperature of the power transmission apparatus.

According to a third aspect of the invention, in the cooling system according to the second aspect of the invention, the power transmission apparatus is configured to transmit an output of a driving prime mover provided in the vehicle, to drive wheels of the vehicle, wherein the fan-rotation control portion is configured to control the rotation of the cooling fan, depending on the physical quantity in the form of a running speed of the vehicle or a prime-mover rotational speed that is a rotational speed of the driving prime mover, such that the rotational speed of the cooling fan is higher when the running speed or the prime-mover rotational speed is high, than when the running speed or the prime-mover rotational speed is low, namely, the rotational speed of the cooling fan is increased with increase of the running speed or the prime-mover rotational speed.

According to a fourth aspect of the invention, in the cooling system according to any one of the first through third aspects of the invention, the cooling fan is configured to reduce an atmospheric temperature around the power transmission apparatus, by blowing outside air to the power transmission apparatus.

According to a fifth aspect of the invention, in the cooling system according to any one of the first through forth aspects of the invention, the fan-rotation control portion is configured to determine whether a running speed of the vehicle is equal to or higher than a fan-cooling speed value, wherein the fan-rotation control portion is configured to control the rotation of the cooling fan, namely, cause the cooling fan to be rotated when the running speed is equal to or higher than the fan-cooling speed value, and to stop the rotation of the cooling fan when the running speed is lower than the fan-cooling speed value.

According to a sixth aspect of the invention, in the cooling system according to any one of the first through fifth aspects of the invention, the vehicle includes an internal combustion engine as the driving prime mover, wherein the power transmission apparatus is an automatic transmission which is disposed adjacent to the engine in a width direction of the vehicle, and which is configured to transmit rotation of the engine to drive wheels of the vehicle at a variable gear ratio, wherein the temperature detection device is configured to detect, as the temperature related to the power transmission apparatus, a transmission lubricant temperature that is a temperature of a lubricant oil of the automatic transmission, wherein the automatic transmission is provided with an oil circulation circuit that includes an oil pump configured to circulate the lubricant oil in the oil circulation circuit and an oil cooler configured to cool the lubricant oil by heat exchange, wherein the engine is provided with a refrigerant circulation circuit that includes a refrigerant pump configured to circulate a refrigerant in the refrigerant circulation circuit and a radiator disposed on a front side of the engine in a running direction of the vehicle so as to cool the refrigerant by outside air, and wherein the cooling fan is disposed on a front side of the radiator in the running direction of the vehicle so as to reduce the atmospheric temperature of the automatic transmission by blowing the outside air to the automatic transmission as well as to the radiator.

According to a seventh aspect of the invention, in the cooling system according to the sixth aspect of the invention, the refrigerant circulation circuit is connected to the oil cooler such that the lubricant oil is cooled by the refrigerant through the oil cooler.

According to an eighth aspect of the invention, in the cooling system according to any one of the first through fifth aspects of the invention, a condenser of an air conditioner is disposed on a front side of the power transmission apparatus in a running direction of the vehicle, wherein the cooling fan is disposed on a front side of the condenser in the running direction of the vehicle so as to reduce the atmospheric temperature of the automatic transmission by blowing outside air to the automatic transmission as well as to the condenser.

According to a ninth aspect of the invention, in the cooling system according to any one of the first through eighth aspects of the invention, the power transmission apparatus includes engagement devices each of which is to be engaged and released, wherein the load limiting portion is configured, when the detected temperature exceeds the limit temperature value, to limit a load applied to the engagement devices.

In the cooling system according to any one of the first through ninth aspects of the invention, the power transmission apparatus is cooled by rotating the cooling fan before the detected temperature related to the power transmission apparatus reaches the limit temperature value, so that it is possible to suppress transition to the load limiting control that is to be executed by the load limiting portion, and accordingly to appropriately maintain an original performance of the vehicle related to the power transmission apparatus. Further, since rotation of the cooling fan is controlled such that the rotational speed of the cooling fan is higher when the temperature of the power transmission apparatus is high than when the temperature is low, the power transmission apparatus is appropriately cooled depending on the temperature of the power transmission apparatus while the noise generated by rotation of the cooling fan is suppressed when the temperature of the power transmission apparatus is relatively low.

In the cooling system according to the third aspect of the invention, the rotation of the cooling fan is controlled depending on the vehicle running speed or the prime-mover rotational speed such that the rotational speed of the cooling fan is higher when the running speed or the prime-mover rotational speed is high, than when the running speed or the prime-mover rotational speed is low. The power transmission apparatus is appropriately cooled depending on the temperature, and the noise generated by the rotation of the cooling fan is mixed with vehicle noise generated depending on the vehicle running speed or the prime-mover rotational speed so as to become unnoticeable. In other words, the vehicle noise is increased with increases of the prime-mover rotational speed and the running speed, and the noise generated by the rotation of the cooling fan becomes unnoticeable owing to the increase of the vehicle noise. Thus, it is possible to suppress the transition to the load limiting control, by increasing a cooling performance for the power transmission apparatus by increasing the rotational speed of the cooling fan with increase of the prime-mover rotational speed or running speed, to such an extent that does not affect an anti-noise performance.

In the cooling system according to the fourth aspect of the invention, the atmospheric temperature is reduced by blowing the outside air onto the power transmission apparatus by the cooling fan, so that the power transmission apparatus is appropriately cooled with reduction of the atmospheric temperature, whereby the transition to the load limiting control can be suppressed.

In the cooling system according to the fifth aspect of the invention, the rotation of the cooling fan is controlled or caused for cooling the power transmission apparatus when the running speed is equal to or higher than the predetermined fan-cooling speed value, and the rotation of the cooling fan is stopped when the running speed is lower than the fan-cooling speed value. That is, in a case in which the noise generated by the rotation of the cooling fan is relatively large with the vehicle noise generated by the driving prime mover being small, for example, during stop or running of the vehicle at an extremely low speed, a higher priority is given to prevention of generation of the noise generated by the rotation of the cooling fan rather than to cooling of the power transmission apparatus, so that a high-quality ride comfortability (tranquility) can be maintained.

In the cooling system according to the sixth aspect of the invention in which the power transmission apparatus is the automatic transmission disposed adjacent to the engine as the driving prime mover, the automatic transmission is provided with the oil circulation circuit that includes the oil cooler configured to cool the lubricant oil, while the engine is provided with the refrigerant circulation circuit that includes the radiator configured to cool the engine-cooling refrigerant by the outside air, so that the atmospheric temperature of the automatic transmission is reduced by the cooling fan which is disposed on the front side of the radiator and which is configured to blow the outside air to the automatic transmission as well as to the radiator. That is, the automatic transmission is cooled with reduction of the atmospheric temperature which is made by blowing the outside air to the automatic transmission by the cooling fan, thereby appropriately suppressing the transition to the load limiting control that is to be executed by the load limiting portion. Further, the atmospheric temperature of the automatic transmission is reduced by utilizing the cooling fan configured to blow the air to the engine-cooling radiator. Therefore, the automatic transmission can be cooled by carrying out the present invention in a simple and inexpensive manner, namely, by simply causing the cooling fan to be rotated when the lubricant oil temperature is not lower than the fan-cooling temperature value, without need of drastic design change and parts addition.

In the cooling system according to the seventh aspect of the invention, the refrigerant circulation circuit is connected to the oil cooler of the oil circulation circuit such that the lubricant oil is cooled through the oil cooler by the refrigerant that is cooled by the radiator. Thus, with the rotational speed of the cooling fan (that is configured to blow the air to the radiator) being controlled depending on the temperature of the automatic transmission, the automatic transmission is appropriately cooled together with reduction of the atmospheric temperature whereby the transition to the load limiting control is more appropriately suppressed.

In the cooling system according to the eighth aspect of the invention, the outside air is blown to the power transmission apparatus as well as to the condenser, by the cooling fan disposed on the front side of the condenser of the air conditioner. The power transmission apparatus is cooled by reduction of the atmospheric temperature of the power transmission apparatus, which is made by utilization of the cooling fan configured to blow the air to the condenser, so that the power transmission apparatus can be cooled by carrying out the present invention in a simple and inexpensive manner, namely, by simply causing the cooling fan to be rotated when the detected temperature related to the power transmission apparatus is not lower than the fan-cooling temperature value, without need of drastic design change and parts addition.

In the cooling system according to the ninth aspect of the invention, the power transmission apparatus includes the engagement devices, and the load applied to the engagement devices is limited when the detected temperature exceeds the limit temperature value. With the load applied to the engagement devices such as the lockup clutch being limited, namely, with an engaging torque or an input torque of each of the engagement devices being limited, an original performance of the power transmission apparatus such as a drivability and a fuel economy performance could be reduced. However, with the transition to the load limiting control being suppressed by cooling made by the cooling fan, it is possible to appropriately maintain the original performance of the power transmission apparatus, namely, to appropriately obtain the effect of the present invention.

DETAILED DESCRIPTION OF PREFERRED EMBODIMENTS

Figure 1:
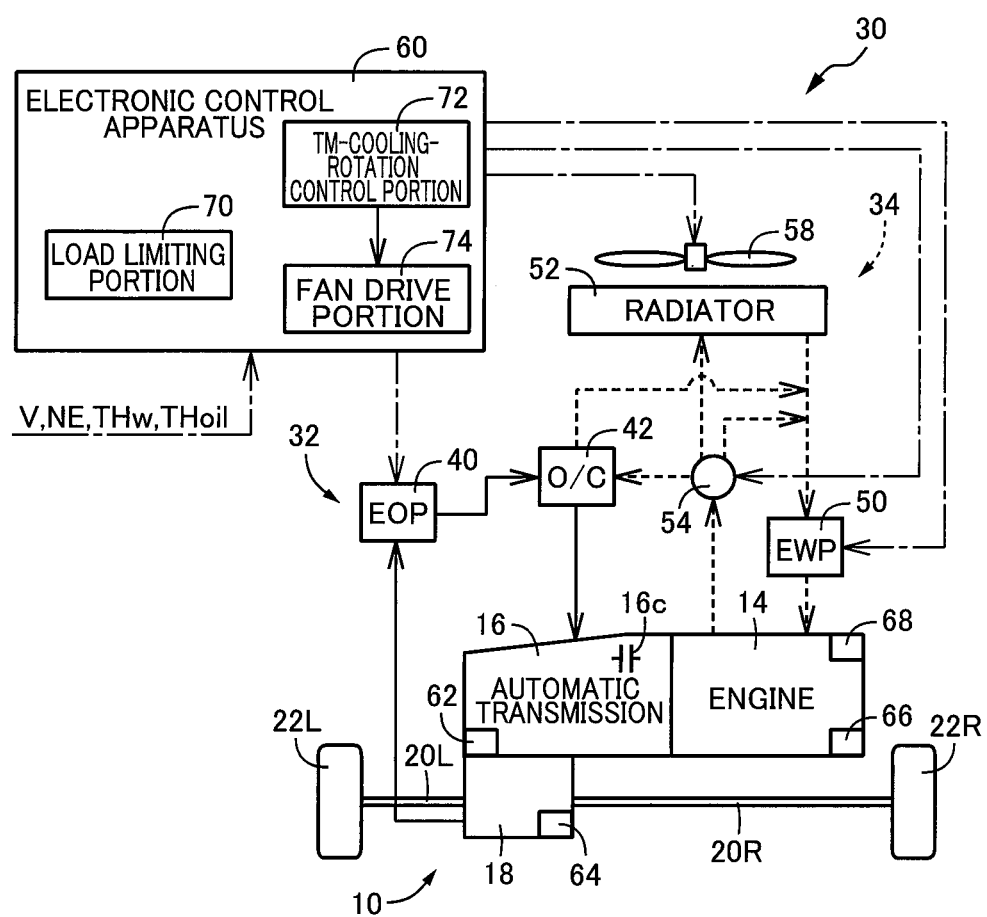
FIG. 1 is a schematic view showing a drive apparatus of a vehicle, to which the present invention is applied, and showing also a cooling system provided in the vehicle.

The present invention is applicable to various types of vehicles such as an engine drive vehicle including a single driving prime mover in the form of an engine (internal combustion engine), a hybrid electric vehicle of parallel or series type including driving prime movers in the form of an engine (internal combustion engine) and an electric motor, and an electric vehicle including a single driving prime mover in the form of an electric motor. The power transmission apparatus may be, for example, an automatic transmission configured to transmit rotation of the driving prime mover such as the engine and the electric motor, to drive wheels at a variable gear ratio, a fluid-type transmission such as a torque converter, a planetary gear device and an engagement device such as a lockup clutch and a friction clutch. The load limiting portion may be, for example, a portion configured to limit an input torque inputted to the power transmission apparatus, inhibit shift to a certain gear position or positions in the automatic transmission, or inhibit a slip control of the engagement device, such that a temperature of the engagement device or a friction member included in the power transmission apparatus does not exceed a guaranteed temperature. The automatic transmission may be a step variable transmission of planetary gear type or two-shaft meshing type, a continuously variable transmission of belt type, or an electrically-operated continuously variable transmission including a planetary gear device and/or a limited slip differential device.

The temperature related to the power transmission apparatus may be, for example, a temperature of a lubricant oil used in the power transmission apparatus, which can be detected directly by an oil temperature sensor or the like. Where the power transmission apparatus is a frictional engagement device, for example, the temperature may be calculated by subtracting an amount of heat radiation (by an outside air, for example) from an amount of heat generation (by an engaging torque, for example). The temperature of the lubricant oil also can be calculated or estimated from the heat generation amount and the heat radiation amount, for example. Further, the temperature related to the power transmission apparatus may be also a temperature of a casing of the power transmission apparatus which is other than the temperature of the lubricant oil. The cooling fan configured to cool the power transmission apparatus is constituted by preferably an existing cooling fan such as a cooling fan provided to blow an outside air to a radiator through which an engine-cooling refrigerant is to flow or a cooling fan provided to blow the outside air to a condenser of an air conditioner. However, the cooling fan configured to cool the power transmission apparatus may be constituted by a cooling fan provided to exclusively cool the power transmission apparatus. The physical quantity that influences the temperature of the power transmission apparatus is preferably a rotational speed of the driving prime mover or a running speed of the vehicle, for example, where the power transmission apparatus is a drive-power transmission apparatus configured to transmit an output of the driving prime mover to the drive wheels. In general, the temperature of the power transmission apparatus is increased with increase of the prime-mover rotational speed or vehicle running speed, due to temperature rise resulting from stirring of the lubricant oil or increase of a rotational friction. It is also possible to use a rotational speed of each rotary element of the power transmission apparatus, as a value representing the vehicle running speed. The power transmission apparatus may be subjected to be cooled also where the power transmission apparatus is other than the drive power transmission apparatus. In that case, too, the rotational speed of each rotary element of the power transmission apparatus can be used as the physical quantity that influences the temperature of the power transmission apparatus. The physical quantity does not necessarily have to be the rotational speed or the vehicle running speed, but may be any one of various kinds of values related to the heat generation amount or heat radiation amount, such as the rotational torque, transmission torque, engaging torque or an integrated value thereof.

It is preferable that the rotation of the cooling fan is controlled or caused when the vehicle running speed is not lower than the fan-cooling speed value, and is stopped when the running speed is lower than the fan-cooling speed value, for example, for assuring a tranquility of the vehicle. However, the rotation of the cooling fan may be controlled or caused irrespective of the running speed, with a higher priority being given to the cooling of the automatic transmission rather than to the tranquility. Where the automatic transmission and the engine are provided with an oil circulation circuit and a refrigerant circulation circuit, respectively, for cooling the lubricant oil and the engine, respectively, such that the refrigerant circulation circuit is connected to an oil cooler of the oil circulation circuit, it is possible to appropriately cool the automatic transmission, by cooling the lubricant oil through the oil cooler as well as reducing the atmospheric temperature through the rotation of the cooling fan blowing the air to the radiator. However, the automatic transmission may be cooled by only one of the cooling of the lubricant oil through the oil cooler and the reduction of the atmospheric temperature through the cooling fan. That is, where the air blown by the cooling fan does not reach the automatic transmission that is subjected to be cooled, the automatic transmission may be cooled only by the cooling of the lubricant oil through the oil cooler, wherein the cooling of the lubricant oil is made by the air blown by the cooling fan. Where the oil circulation circuit and the refrigerant circulation circuit are provided independently of each other, the automatic transmission may be cooled only by the reduction of the atmospheric temperature which is made by the air blown by the cooling fan.

EMBODIMENTS

There will be described embodiments of the present invention in details with reference to drawings.

FIG. 1 is a schematic view showing a drive apparatus of a vehicle 10 that includes a cooling system 30 constructed according to an embodiment of the present invention. The vehicle 10 is an engine drive vehicle including a single driving prime mover in the form of an engine 14. An output of the engine 14 is transmitted to a differential device 18 through an automatic transmission 16, and then is distributed from the differential device 18 to right and left drive shafts 20R, 20L so as to be eventually transmitted to right and left drive wheels 22R, 22L. The engine 14 is a transverse engine that is mounted in the vehicle 10 such that an axis of a crankshaft of the engine 14 extends in a width direction of the vehicle 10. Thus, in the drive apparatus of the vehicle 10, the automatic transmission 16 is disposed adjacent to the engine 14 in the width direction. The engine 14 is an internal combustion engine such as a gasoline engine and a diesel engine. The automatic transmission 16 is configured to transmit rotation of the engine 14 to the drive wheels 22R, 22L at a variable gear ratio, and includes a planetary-gear type step-variable transmission and a torque converter with a lockup clutch, for example. The automatic transmission 16 is a power transmission apparatus that is to be cooled by the cooling system 30, and includes heat generation elements in the form of frictional engagement devices 16c such as a the lockup clutch and clutches and brakes that are to be used in shifting operations executed in the automatic transmission 16.

The cooling system 30 includes an oil circulation circuit 32 (indicated by solid line in FIG. 1) and a refrigerant circulation circuit 34 (indicated by broken line in FIG. 1). The oil circulation circuit 32 is provided for cooling a lubricant oil in the automatic transmission 16, and includes an electrically-operated oil pump (EOP) 40 and an oil cooler (O/C) 42. The lubricant oil, which is stored in an oil reservoir provided in a lower portion of a casing of the automatic transmission 16, is suctioned by the oil pump 40, and is delivered to the oil cooler 42. After being cooled by the oil cooler 42, the lubricant oil is returned to the oil reservoir in the casing of the automatic transmission 16. The differential device 18 is disposed inside the casing of the automatic transmission 16, so as to be lubricated by the lubricant oil in the automatic transmission 16. The oil cooler 42, which is connected to the refrigerant circulation circuit 34, is a water-cooled heat exchanger configured to cooperate with a refrigerant of the refrigerant circulation circuit 34 so as to cool the lubricant oil by heat exchange. It is noted that the electrically-operated oil pump 40 may be replaced with a mechanically-operated pump that is to be mechanically driven by the engine 14 and power transmission shafts, for example, during running of the vehicle 10.

The refrigerant circulation circuit 34 is provided to cool the engine 14 by the refrigerant such as a coolant fluid. The refrigerant circulation circuit 34 includes an electrically-operated refrigerant pump (EWP) 50 and a radiator 52, and is connected to the engine 14 and the oil cooler 42. The radiator 52 is an air-cooled heat exchanger configured to cool the refrigerant by outside air, and is disposed on a front side of the engine 14 and the automatic transmission 16 in a running direction of the vehicle 10. The refrigerant is to be circulated, by the refrigerant pump 50, in the refrigerant circulation circuit 34, so as to be supplied to the engine 14 and the oil cooler 42, so that the engine 14 and the lubricant oil of the automatic transmission 16 are cooled by the refrigerant that is cooled by the radiator 52. The oil cooler 42 serves also as an oil warmer for facilitating warming up of the automatic transmission 16 at low temperatures. The refrigerant circulation circuit 34 is provided with a switching valve 54 constituted by, for example, an electromagnetic valve that is to be electrically operated. The switching valve 54 is to be switched to establish a selected one or two of three channels that consist of a first channel through which the refrigerant coming out of the engine 14 is to be supplied to the refrigerant pump 50 via the oil cooler 42, a second channel through which the refrigerant coming out of the engine 14 is to be supplied to the refrigerant pump 50 via the radiator 52, and a third channel through which the refrigerant coming out of the engine 14 is to be supplied directly to the refrigerant pump 50. It is noted that the electrically-operated refrigerant pump 50 may be replaced with a mechanically-operated pump that is to be mechanically driven by the engine 14 and power transmission shafts, for example, during running of the vehicle 10.

A cooling fan 58 is disposed on a front side of the radiator 52 in the running direction of the vehicle 10, so as to cool the refrigerant by forcibly blowing outside air to the radiator 52. Since the cooling fan 58 and the radiator 52 are disposed on the front side of the automatic transmission 16, the outside air supplied to the radiator 52 by the cooling fan 58 is supplied also to the automatic transmission 16, whereby an atmospheric temperature around the automatic transmission 16 is reduced. A rotational speed of the cooling fan 58 is to be changed depending on a duty ratio of a drive current supplied thereto. With the rotational speed of the cooling fan 58 being adjusted, it is possible to adjust an amount of air supplied to the radiator 52 and the automatic transmission 16, namely, to cool the radiator 52 and the automatic transmission 16 to an adjusted degree.

The cooling system 30 includes an electronic control apparatus 60 for controlling operations of the above-described oil pump 40, refrigerant pump 50, switching valve 54 and cooling fan 58. The electronic control apparatus 60 includes a so-called microcomputer incorporating a CPU, a ROM, a RAM and an input-output interface. The CPU controls the operations of the oil pump 40, refrigerant pump 50, switching valve 54 and cooling fan 58, by processing various input signals, according to control programs stored in the ROM, while utilizing a temporary data storage function of the RAM. The electronic control apparatus 60 receives various input signals based on values detected by respective sensors provided in the vehicle 10. That is, various kinds of information, which are required for controlling the operations, are supplied to the electronic control apparatus 60. Specifically, the electronic control apparatus 60 receives: an output signal of a vehicle speed sensor 62 indicative of a running speed V of the vehicle 10; an output signal of an oil temperature sensor 64 indicative of a lubricant oil temperature THoil; an output signal of an engine speed sensor 66 indicative of an engine rotational speed Ne; and an output signal of a refrigerant temperature sensor 68 indicative of a refrigerant temperature THw, for example. It is also possible to detect an outside air temperature THa such that the detected outside air temperature THa is reflected on the operations. The electronic control apparatus 60 further receives information such as diagnoses or the like related to anomalies of the various sensors.

The vehicle speed sensor 62 is provided to detect an output rotational speed Nout of the automatic transmission 16, for example, and calculate the running speed V based on the detected output rotational speed Nout. The oil temperature sensor 64 is provided in the oil reservoir in the lower portion of the casing of the automatic transmission 16, for example, so as to measure the lubricant oil temperature THoil. The lubricant oil temperature THoil is a temperature related to the automatic transmission 16 that is to be cooled by the cooling system 30. The oil temperature sensor 64 corresponds to a temperature detection device. The engine rotational speed NE is a prime-mover rotational speed, and corresponds to a physical quantity that influences the lubricant oil temperature THoil as the temperature related to the automatic transmission 16 that is to be cooled by the cooling system 30. That is, the higher the engine rotational speed NE, the higher the lubricant oil temperature THoil and the higher the temperature of each part of the automatic transmission 16, due to temperature rise resulting from stirring of the lubricant oil and heat conduction or radiation from the engine 14.

For cooling the lubricant oil of the automatic transmission 16, the electronic control apparatus 60 controls the operation of the oil pump 40, depending on the lubricant oil temperature THoil, for example. Further, for cooling the engine 14, the electronic control apparatus 60 controls the operations of the refrigerant pump 50, switching valve 54 and cooling fan 58, depending on the refrigerant temperature THw, for example. That is, the fuel economy performance, emission performance, anti-heat-damage performance and other performances are ensured by controlling flow rate and flow path of the refrigerant and amount of air blown by the cooling fan 58 by taking account of heat generated by the engine 14. In connection with the hardware protection of the automatic transmission 16 that is subjected to be cooled by the cooling fan 58, the electronic control apparatus 60 functionally includes a load limiting portion 70, a TM-cooling-rotation control portion 72 and a fan drive portion 74. TM-cooling-rotation control portion 72 and the fan drive portion 74 cooperate with each other to constitute a fan-rotation control portion configured to control rotation of the cooling fan 58 for cooling the automatic transmission 16.

Figure 2:
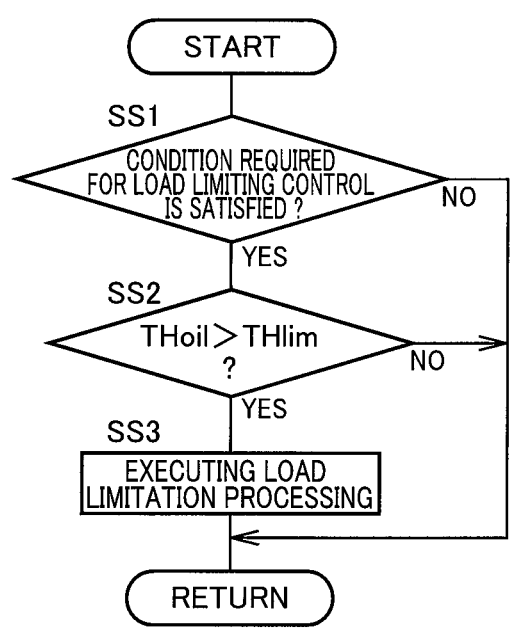
FIG. 2 is a flow chart showing a control routine to be executed by a load limiting portion that is functionally included in an electronic control apparatus shown in FIG. 1, so as to limit a load applied to an automatic transmission shown in FIG. 1.

FIG. 2 is a flow chart showing a control routine to be executed by the load limiting portion 70, so as to execute a load limiting control for protecting the hardware of the automatic transmission 16. As shown in FIG. 2, the control routine is initiated with step SS1 that is implemented to determine whether a condition required for the execution of the load limiting control is satisfied or not, for example, whether various sensors required for the execution of the load limiting control work normally or not, depending on information such as the above-described diagnoses. In the present embodiment, at step SS1, it is determined whether the oil temperature sensor 64 configured to detect the lubricant oil temperature THoil works normally or not. When it is determined that the oil temperature sensor 64 works normally, step SS2 is implemented. When it is determined that the oil temperature sensor 64 does not work normally, one cycle of execution of the control routine is terminated. At step SS2, it is determined whether the lubricant oil temperature THoil exceeds a limit temperature value THlim or not, wherein the limit temperature value THlim is a predetermined temperature value that is determined from a point of view of the hardware protection. When the lubricant oil temperature THoil is not higher than the limit temperature value THlim (THoil≤THlim), one cycle of execution of the control routine is terminated. When the lubricant oil temperature THoil is higher than the limit temperature value THlim (THoil>THlim), the control flow goes to step SS3 at which a load limitation processing is executed. In the load limitation processing executed at step SS3, a request inhibiting a flex control (slip control) of the lockup clutch of the torque converter is outputted, for example, for assuring prevention of clogging of the lockup clutch, wherein the request is supplied to, for example, a shifting control ECU that is configured to control the lockup clutch. To this end, the limit temperature value THlim is determined from a point of view of assuring the prevention of the clogging of the lockup clutch. To inhibit the flex control of the lockup clutch is to limit a load applied to the lockup clutch as one of the engagement devices 16c. It is preferable to release the lockup clutch for limiting the load applied to the lockup clutch. However, the load applied to the lockup clutch may be limited also by fully engaging the lockup clutch. Further, in the load limitation processing executed at step SS3, a request inhibiting shift to a certain gear position or positions is outputted to the shifting control ECU, for assuring durability of bearings or other elements of the planetary-gear type step-variable transmission. To this end, the limit temperature value THlim is determined from a point of view of assuring the durability of the bearings or the other elements. It is also possible to determine the limit temperature value THlim and a content of the load limitation processing, from a point of view of protecting of the other hardware of the automatic transmission 16.

Figure 3:
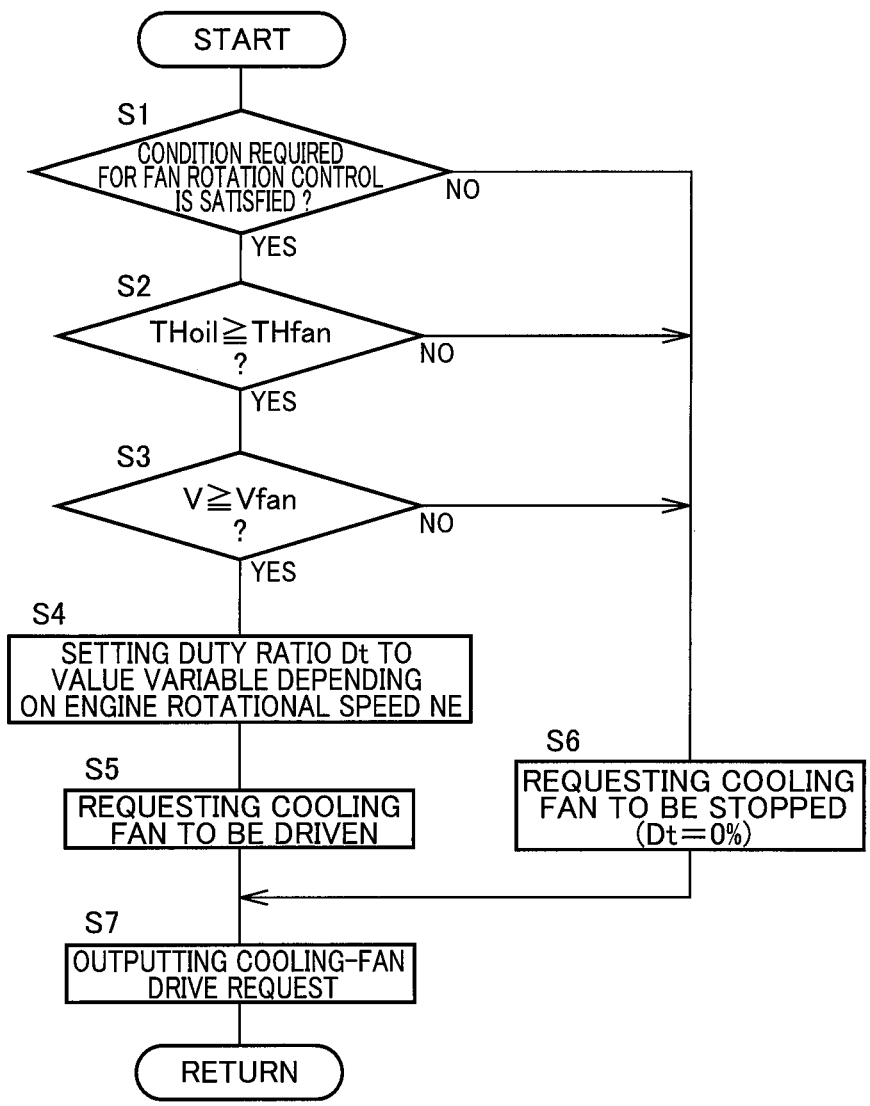
FIG. 3 is a flow chart showing a control routine to be executed by a TM-cooling-rotation control portion that is functionally included in the electronic control apparatus shown in FIG. 1, so as to cool the automatic transmission by rotating a cooling fan.

When the load applied to the automatic transmission 16 is limited by execution of the load limitation processing by the load limitation processing 70, an original performance of the automatic transmission 16 could be compromised. That is, with the load limitation processing being executed, a fuel economy performance and a drivability such as acceleration performance and driving feeling could be reduced. For example, with the flex control of the lockup clutch as one of the engagement devices 16c being inhibited, the fuel economy performance and the drivability could be reduced. In the present embodiment, the TM-cooling-rotation control portion 72 is provided to cool the automatic transmission 16 by using the cooling fan 58 (that is provided to cool mainly the engine 14), before the load limitation processing is executed by the load limiting portion 70. FIG. 3 is a flow chart showing a control routine to be executed by the TM-cooling-rotation control portion 72, for executing a fan rotation control, namely, controlling rotation of the cooling fan 58, so as to cool the automatic transmission 16 by rotating the cooling fan 58, thereby making it possible to suppress transition to the load limiting control executed by the load limiting portion 70. In the present embodiment, with increase of the rotational speed of the cooling fan 58, the outside air is blown to the automatic transmission 16 as well as to the radiator 52 whereby the atmospheric temperature of the automatic transmission 16 is reduced, and the lubricant oil of the automatic transmission 16 is appropriately cooled through the oil cooler 42 by the refrigerant flowing through the radiator 52. Thus, with the atmospheric temperature being reduced and with the lubricant oil being cooled, the automatic transmission 16 is appropriately cooled. In this case, the switching valve 54 of the refrigerant circulation circuit 34 is held in a connection state that establishes the above-described first and second channels through which the refrigerant coming out of the engine 14 is to be supplied to both of the oil cooler 42 and the radiator 52, such that the refrigerant cooled in the radiator 52 is supplied also to the oil cooler 42.

The control routine shown in the flow chart of FIG. 3 is initiated with step S1 that is implemented to determine whether a condition required for the execution of the fan rotation control for cooling the automatic transmission 16, is satisfied or not, for example, whether various sensors required for the execution of the fan rotation control work normally or not, depending on information such as the above-described diagnoses. In the present embodiment, at step S1, it is determined whether the vehicle speed sensor 62 configured to detect the running speed V, the oil temperature sensor 64 configured to detect the lubricant oil temperature THoil and the engine speed sensor 66 configured to detect the engine rotational speed NE work normally or not. When it is determined that all of the vehicle speed sensor 62, oil temperature sensor 64 and engine speed sensor 66 work normally, step S2 is implemented. When it is determined at least one of the vehicle speed sensor 62, oil temperature sensor 64 and engine speed sensor 66 does not work normally, step S6 is implemented. At step S6, a TM duty ratio Dt, i.e., a duty ratio of the drive current applied to the cooling fan 58 for cooling the automatic transmission 16 is set to 0 (zero), and a request stopping the cooling fan 58 is determined.

At step S2, it is determined whether the lubricant oil temperature THoil is equal to or higher than a predetermined fan-cooling temperature value THfan that≥≥is lower than the above-described limit temperature value THlim. When the lubricant oil temperature THoil is not lower than the fan-cooling temperature value THfan (THoil≥THfan), step S3 is implemented. When the lubricant oil temperature THoil is lower than the fan-cooling temperature value THfan (THoil<THfan), step S6 is implemented whereby the TM duty ratio Dt is set to 0 (zero). The fan-cooling temperature value THfan is set to such a value that makes a determination that, as long as the lubricant oil temperature THoil is not lower than the set value, a higher priority is to be given to cooling the automatic transmission 16 rather than avoiding noise generated by the rotation of the cooling fan 58. At step S3, it is determined whether the running speed V is equal to or higher than the fan-cooling speed value Vfan. When the running speed V is equal to or higher than the fan-cooling speed value Vfan (V≥Vfan), step S4 is implemented. When the running speed V is lower than the fan-cooling speed value Vfan (V<Vfan), step S6 is implemented whereby the TM duty ratio Dt is set to 0 (zero). That is, the fan-cooling speed value Vfan is determined such that even small noise generated by the rotation of the cooling fan 58 is noticeable during stop or running of the vehicle 10 at an extremely low running speed, namely, when the running speed V is lower than the determined fan-cooling speed value Vfan, and such that the noise generated by the rotation of the cooling fan 58 becomes unnoticeable when the running speed V becomes not lower than the determined fan-cooling speed value Vfan, because the noise by the rotation of the cooling fan 58 is mixed with vehicle noise such as road noise and engine noise.

Figures 4, 5:
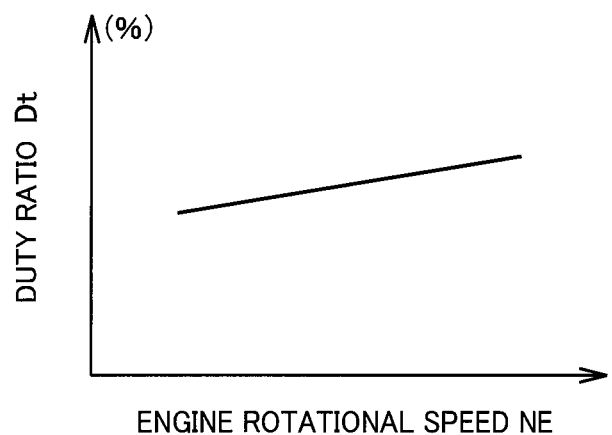
FIG. 4 shows, by way of example, a map that is to be used to set a TM duty ratio Dt to a value variable depending on an engine rotational speed NE at step S4 in the control routine shown in FIG. 3.
FIG. 5 shows an example of the map shown in FIG. 4.

At step S4, the TM duty ratio Dt, which is the duty ratio of the drive current applied to the cooling fan 58 for cooling the automatic transmission 16, is set to a value variable depending on the engine rotational speed NE. Specifically, as shown in a map of FIG. 4, the TM duty ratio Dt is set to a value that is increased with increase of the engine rotational speed NE, so that the rotational speed of the cooling fan 58 is increased with increase of the engine rotational speed NE. As described above, the higher the engine rotational speed NE, the higher the lubricant oil temperature THoil and the higher the temperature of parts (including the engagement devices 16c) of the automatic transmission 16, due to temperature rise resulting from stirring of the lubricant oil and heat conduction or radiation from the engine 14. Therefore, as shown in FIG. 4, the TM duty ratio Dt is set to the value variable depending on the engine rotational speed NE such that the TM duty ratio Dt is higher when the temperature of the automatic transmission 16 is high than when the temperature of the automatic transmission 16 is low. Thus, when the engine rotational speed NE is low, the rotational speed of the cooling fan 58 is reduced so as to suppress the noise by the rotation of the cooling fan 58. When the engine rotational speed NE is high, the rotational speed of the cooling fan 58 is increased so as to increase performance of cooling the automatic transmission 16 since the noise by the rotation of the cooling fan 58 becomes unnoticeable owing to increase of background noise such as the engine noise, which is caused by increase of the engine rotational speed NE. FIG. 5 shows, by way of example, a data map of the TM duty ratio Dt that is set to the value variable depending on the engine rotational speed NE as described above. In the example shown in FIG. 5, the data map is determined such that the TM duty ratio Dt is set to 60% when the engine rotational speed NE is 2000 rpm, 64% when the engine rotational speed NE is 2500 rpm, and 68% when the engine rotational speed NE is 3000 rpm. It is noted that the data map is determined, through an experimentation or the like, for each one of various types of vehicles. It is also noted that the TM duty ratio Dt may be set to a value continuously variable depending on the engine rotational speed NE, or alternatively, may be set to a value variable in steps such as two or three steps.

Step S4 is followed by step S5 that is implemented to determine a drive request such that the cooling fan 58 is rotated with the TM duty ratio Dt that is the value set at step S4. Step S5 or step S6 is followed by step S7 that is implemented to output the request that corresponds to the drive request determined at step S5 or the stop request determined at step S6. Since the TM duty ratio Dt is set to 0 (zero) at step S6, step S7 is implemented to practically output the drive request determined at step S5. The cooling fan 58 is provided to cool mainly the engine 14, so that an engine duty ratio De, i.e., a duty ratio of the drive current supplied to the cooling fan 58 for cooling the engine 14, is calculated, by an engine-cooling-rotation control portion (not shown), depending on the refrigerant temperature THw, for example. Therefore, the fan drive portion 74 compares the engine duty ratio De with the above-described TM duty ratio Dt and controls the drive current supplied to the cooling fan 58 in accordance with a higher one of the engine duty ratio De and the TM duty ratio Dt. It is noted that the TM-cooling-rotation control portion 72 and the fan drive portion 74 (shown in FIG. 1) may cooperate with the engine-cooling-rotation control portion to constitute a fan-rotation control portion that has functions of the TM-cooling-rotation control portion 72, the fan drive portion 74 and the engine-cooling-rotation control portion.

As described above, in the cooling system 30 of the present embodiment, which is provided in the vehicle 10, the automatic transmission 16 is cooled by rotating the cooling fan 58 before the lubricant oil temperature THoil of the automatic transmission 16 reaches the limit temperature value THlim (THlim>THoil≥THfan), so that it is possible to suppress transition to the load limiting control that is to be executed by the load limiting portion 70, and accordingly to appropriately maintain an original performance of the automatic transmission 16 such as the drivability and fuel economy performance. Further, the TM duty ratio Dt is set to a value depending on the engine rotational speed NE as the physical quantity that influences the temperature of the automatic transmission 16, such that the rotational speed of the cooling fan 58 is higher when the temperature of the automatic transmission 16 is high than when the temperature is low, and the rotational speed of the cooling fan 58 is controlled depending on the TM duty ratio Dt. Therefore, the automatic transmission 16 is appropriately cooled depending on the temperature of the automatic transmission 16 while the noise generated by the rotation of the cooling fan 58 is suppressed when the temperature of the automatic transmission 16 is relatively low.

Further, the rotation of the cooling fan 58 is controlled depending on the engine rotational speed NE that influences the temperature of the automatic transmission 16 configured to transmit the output of the engine 14 to the drive wheels 22R, 22L, such that the rotational speed of the cooling fan 58 is higher with the TM duty ratio Dt being higher when the engine rotational speed NE is high, than when the engine rotational speed NE is low. Thus, the automatic transmission 16 is appropriately cooled depending on the temperature, and the noise generated by the rotation of the cooling fan 58 is mixed with vehicle noise generated depending on the rotation of the engine 14 so as to become unnoticeable. In other words, the vehicle noise is increased with increases of the engine rotational speed NE, and the noise generated by the rotation of the cooling fan 58 becomes unnoticeable owing to the increase of the vehicle noise. Thus, it is possible to appropriately suppress the transition to the load limiting control that is to be executed by the load limiting portion 70, by increasing a cooling performance for the automatic transmission 16 by increasing the rotational speed of the cooling fan 58 with increase of the engine rotational speed NE, to such an extent that does not affect an anti-noise performance.

Further, the rotation of the cooling fan 58 is controlled, namely, the cooling fan 58 is rotated, for cooling the automatic transmission 16 when the running speed V is equal to or higher than the predetermined fan-cooling speed value Vfan, and the rotation of the cooling fan 58 is stopped when the running speed V is lower than the fan-cooling speed value Vfan. That is, in a case in which the noise generated by the rotation of the cooling fan 58 is relatively large with the vehicle noise generated by the engine noise or road noise being small, for example, during stop or running of the vehicle 10 at an extremely low speed, a higher priority is given to prevention of generation of the noise generated by the rotation of the cooling fan 58 rather than to cooling of the automatic transmission 16, so that a high-quality ride comfortability (tranquility) can be maintained.

Further, the automatic transmission 16, which is to be subjected to be cooled, is disposed adjacent to the engine 14. The automatic transmission 16 is provided with the oil circulation circuit 32 that includes the oil cooler 42 configured to cool the lubricant oil, while the engine 14 is provided with the refrigerant circulation circuit 34 that includes the radiator 52 configured to cool the engine-cooling refrigerant by the outside air, so that the atmospheric temperature of the automatic transmission 16 is reduced by the cooling fan 58 which is disposed on the front side of the radiator 52 and which is configured to blow the outside air to the automatic transmission 16 as well as to the radiator 52. That is, the automatic transmission 16 is cooled with reduction of the atmospheric temperature which is made by blowing the outside air to the automatic transmission 16 by the cooling fan 58, thereby appropriately suppressing the transition to the load limiting control that is to be executed by the load limiting portion 70. Further, the atmospheric temperature of the automatic transmission 16 is reduced by utilizing the cooling fan 58 configured to blow the air to the engine-cooling radiator 52. Therefore, the automatic transmission 16 can be cooled by carrying out the present invention in a simple and inexpensive manner, namely, by simply causing the cooling fan 58 to be rotated when the lubricant oil temperature THoil is not lower than the fan-cooling temperature value THfan, without need of drastic design change and parts addition.

Further, the refrigerant circulation circuit 34 is connected to the oil cooler 42 of the oil circulation circuit 32 such that the lubricant oil of the automatic transmission 16 is cooled through the oil cooler 42 by the refrigerant that is cooled by the radiator 52. Thus, with the rotational speed of the cooling fan 58 (that is configured to blow the air to the radiator 52) being controlled depending on the temperature of the automatic transmission 16, the automatic transmission 16 is appropriately cooled together with reduction of the atmospheric temperature, whereby the transition to the load limiting control (that is to be executed by the load limiting portion 70) is more appropriately suppressed.

Further, the load applied to the engagement devices 16c is limited by the load limiting portion 70 when the lubricant oil temperature THoil exceeds the limit temperature value THlim. With the flex control of the lockup clutch being inhibited, for example, the original performance of the automatic transmission 16 such as the drivability and fuel economy performance could be reduced. However, with the transition to the load limiting control being suppressed by the cooling made by the cooling fan 58, it is possible to appropriately maintain the original performance of the automatic transmission 16, namely, to appropriately obtain the effect of the present invention.

There will be described other embodiments of this invention. The same reference signs as used in the above-described embodiment will be used in the following embodiments, to identify the functionally corresponding elements, and detailed descriptions thereof are not provided.

Figure 6:
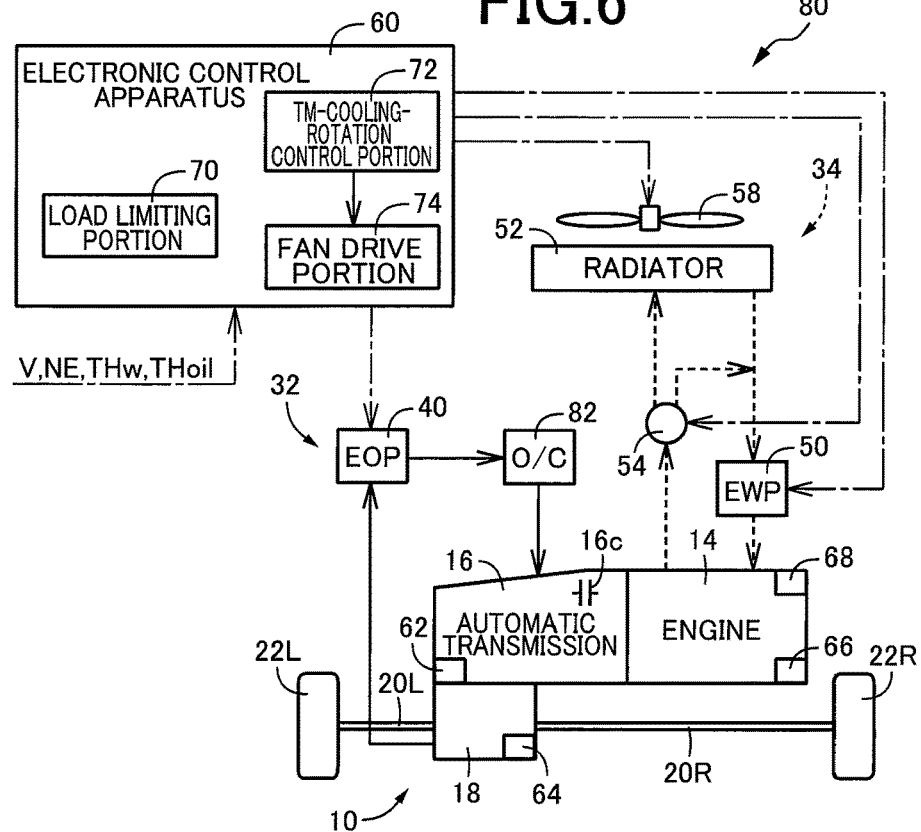
FIG. 6 is a view for explaining another embodiment of the present invention, wherein the view corresponds to the view of FIG. 1.

FIG. 6 is a view for explaining another embodiment of the present invention, wherein the view corresponds to the view of FIG. 1. A cooling system 80 according to this embodiment is different from the cooling system 30 according to the above-described embodiment in that the oil circulation circuit 32 of the automatic transmission 16 and the refrigerant circulation circuit 34 of the engine 14 are provided independently of each other. That is, an oil cooler (O/C) 82 provided in the oil circulation circuit 32 is an air-cooled heat exchanger configured to cool the lubricant oil passing through the oil cooler 82, by the outside air. In this embodiment, the cooling fan 58 is disposed on a front side of the radiator 52 in the running direction of the vehicle 10 so as to blow the outside air to the automatic transmission 16 as well as to the radiator 52, so that the automatic transmission 16 is cooled exclusively by reduction of the atmospheric temperature which is made by blowing of the outside air by the cooling fan 58. That is, in this embodiment, substantially the same effect can be obtained as in the above-described embodiment, except that the lubricant oil of the automatic transmission 16 is not cooled by the refrigerant of the refrigerant circulation circuit 34 through the oil cooler 82. It is noted that, although the automatic transmission 16 is cooled by the lubricant oil that is cooled by the oil cooler 82, the cooling of the automatic transmission 16 by the lubricant oil is not cooling owing to the rotation of the cooling fan 58.

Figure 7:
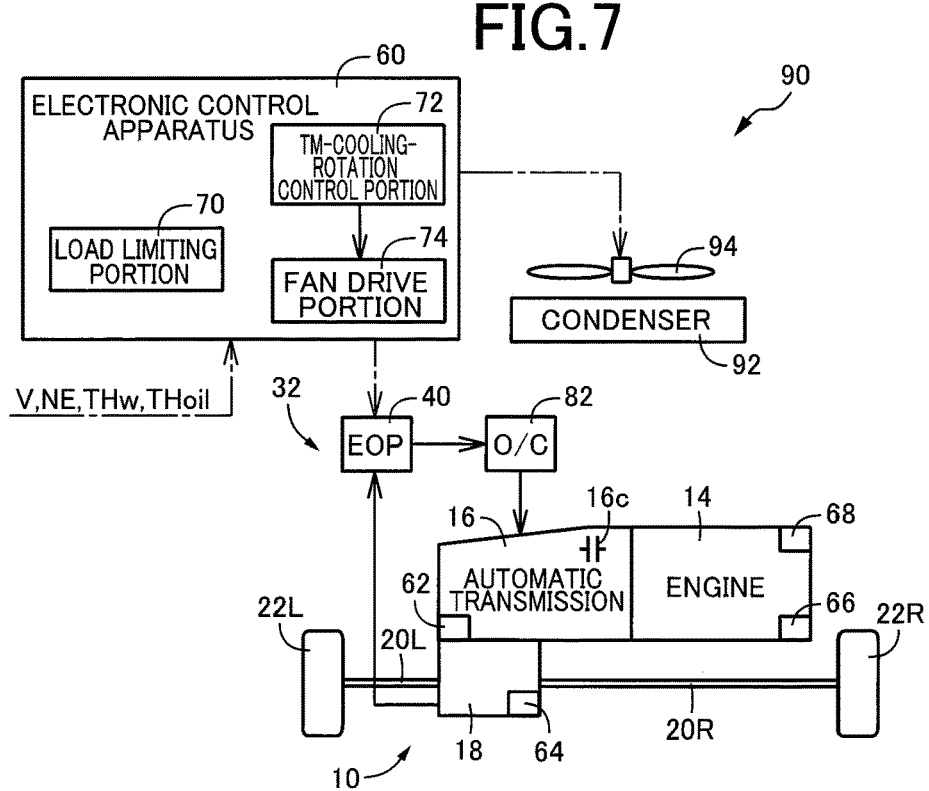
FIG. 7 is a view for explaining still another embodiment of the present invention, wherein the view corresponds to the view of FIG. 1.

FIG. 7 is a view for explaining still another embodiment of the present invention, wherein the view corresponds to the view of FIG. 1. A cooling system 90 according to this embodiment is different from the cooling system 80 shown in FIG. 6 in that the atmospheric temperature of the automatic transmission 16, which is subjected to be cooled by the cooling system 90, is reduced by utilizing a cooling fan 94 configured to cool a condenser 92 of an air conditioner as an air conditioning device by blowing the outside air to the condenser 92. That is, the condenser 92 is disposed on a front side of the engine 14 and the automatic transmission 16 in the running direction of the vehicle 10, and the cooling fan 94 is disposed on a front side of the condenser 92 in the running direction so as to blow the outside air to the automatic transmission 16 as well as to the condenser 92, so that the automatic transmission 16 is cooled by reduction of the atmospheric temperature which is made by blowing of the outside air by the cooling fan 94. The cooling fan 94 may be controlled through the control routine shown by the flow chart of FIG. 3. It is noted that, also in this embodiment, although the automatic transmission 16 is cooled by the lubricant oil that is cooled by the oil cooler 82, the cooling of the automatic transmission 16 by the lubricant oil is not cooling owing to the rotation of the cooling fan 94.

In this embodiment shown in FIG. 7, substantially the same effect can be obtained as in the above-described embodiment shown in FIG. 6, except that the cooling fan 94 for cooling the condenser is utilized in place of the cooling fan 58 for cooling the engine. The outside air is blown by, the cooling fan 94 disposed on the front side of the condenser 92, to the automatic transmission 16 as well as to the condenser 92, so that the atmospheric temperature of the automatic transmission 16 is reduced. Thus, the automatic transmission 16 is cooled by reduction of the atmospheric temperature of the automatic transmission 16, which is made by utilization of the cooling fan 94 configured to blow the air to the condenser 92, so that the automatic transmission 16 can be cooled by carrying out the present invention in a simple and inexpensive manner, namely, by simply causing the cooling fan 94 to be rotated when the lubricant oil temperature THoil is not lower than the fan-cooling temperature value THfan, without need of drastic design change and parts addition.

Where the cooling fan 58 for cooling the engine 14 as well as the cooling fan 94 for cooling the condenser 92 is disposed on the front side of the automatic transmission 16, the outside air can be blown to the automatic transmission 16 by the cooling fan 58 as well as by the cooling fan 94. In this arrangement with both of the cooling fan 58 and the cooling fan 94, the automatic transmission 16 can be cooled by causing both of the cooling fans 58, 94 to be rotated when the lubricant oil temperature THoil is not lower than the fan-cooling temperature value THfan.

Figure 8:
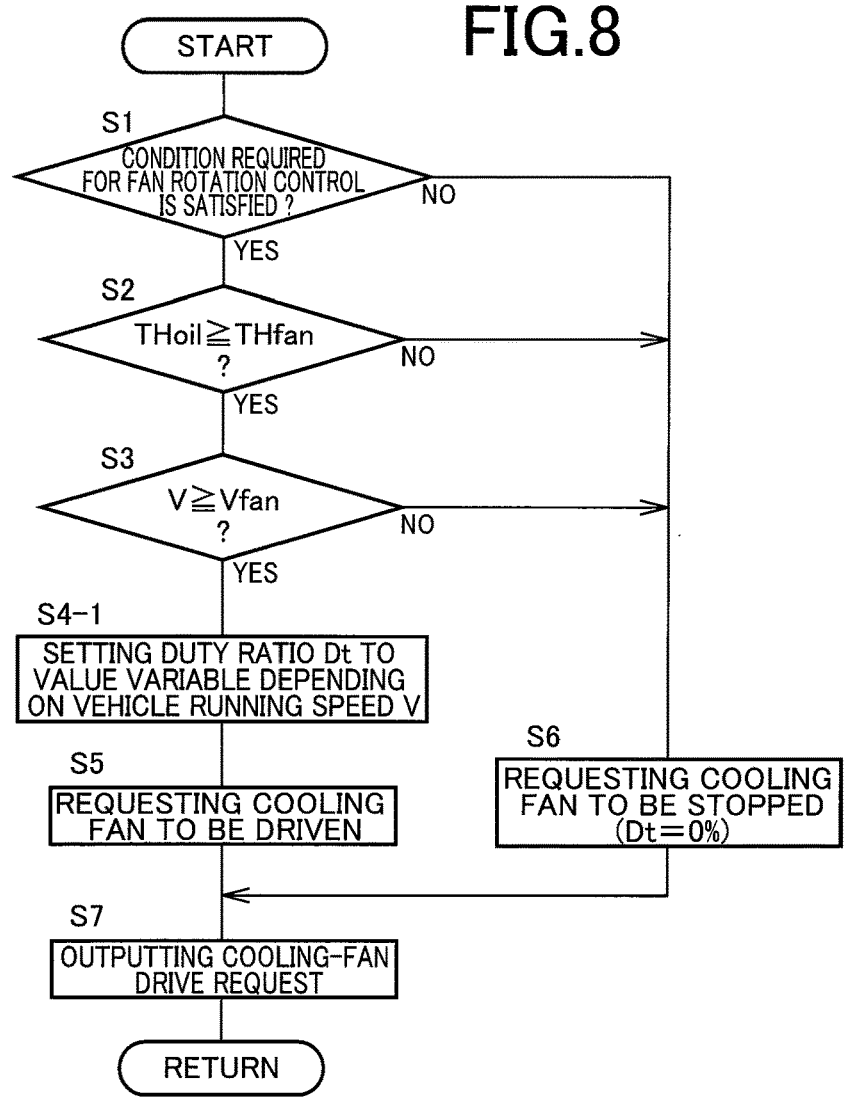
FIG. 8 is a flow chart for explaining still another embodiment of the present invention, wherein the flow chart corresponds to the flow chart of FIG. 3.
Figure 9:
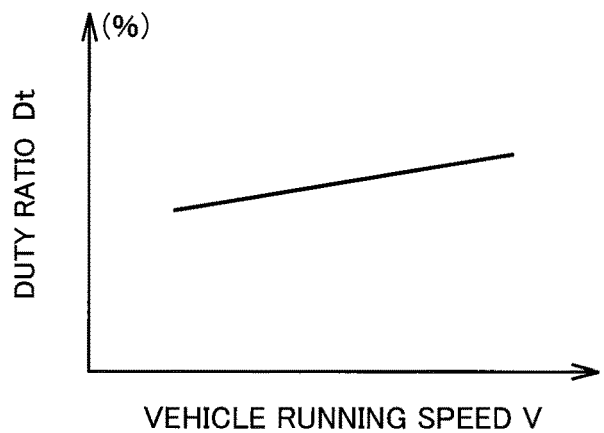
FIG. 9 shows, by way of example, a map that is to be used to set the TM duty ratio Dt to a value variable depending on a vehicle running speed V at step S4-1 in a control routine shown in FIG. 8.

FIG. 8 is a flow chart for a control routine that is to be executed, in place of the control routine shown by the flow chart of FIG. 3, by the TM-cooling-rotation control portion 72. This control routine is different from the control routine shown in FIG. 3 in that step S4-1 is implemented in place of step S4. In this embodiment, at step S4-1, the TM duty ratio Dt, which is the duty ratio of the drive current applied to the cooling fan 58 for cooling the automatic transmission 16, is set to a value variable depending on the running speed V, unlike at step S4 at which the TM duty ratio Dt is set to the value variable depending on the engine rotational speed NE. The running speed V as well as the engine rotational speed NE corresponds to a physical quantity that influences the temperature of the automatic transmission 16, so that the higher the running speed V, the higher the lubricant oil temperature THoil and the higher the temperature of the automatic transmission 16, due to temperature rise resulting from stirring of the lubricant oil, for example. The noise by the rotation of the cooling fan 58 becomes unnoticeable owing to increase of background noise such as the engine noise and road noise, which is caused by increase of the running speed V. Therefore, substantially the same effect can be obtained as in the above-described embodiments, by increasing the TM duty ratio Dt with increase of the running speed V so as to increase the rotational speed of the cooling fan 58 with increase of the running speed V, as shown in a map of FIG. 9, for example. It is noted that the TM duty ratio Dt may be set to a value continuously variable depending on the running speed V, or alternatively, may be set to a value variable in steps such as two or three steps.

Figure 10:
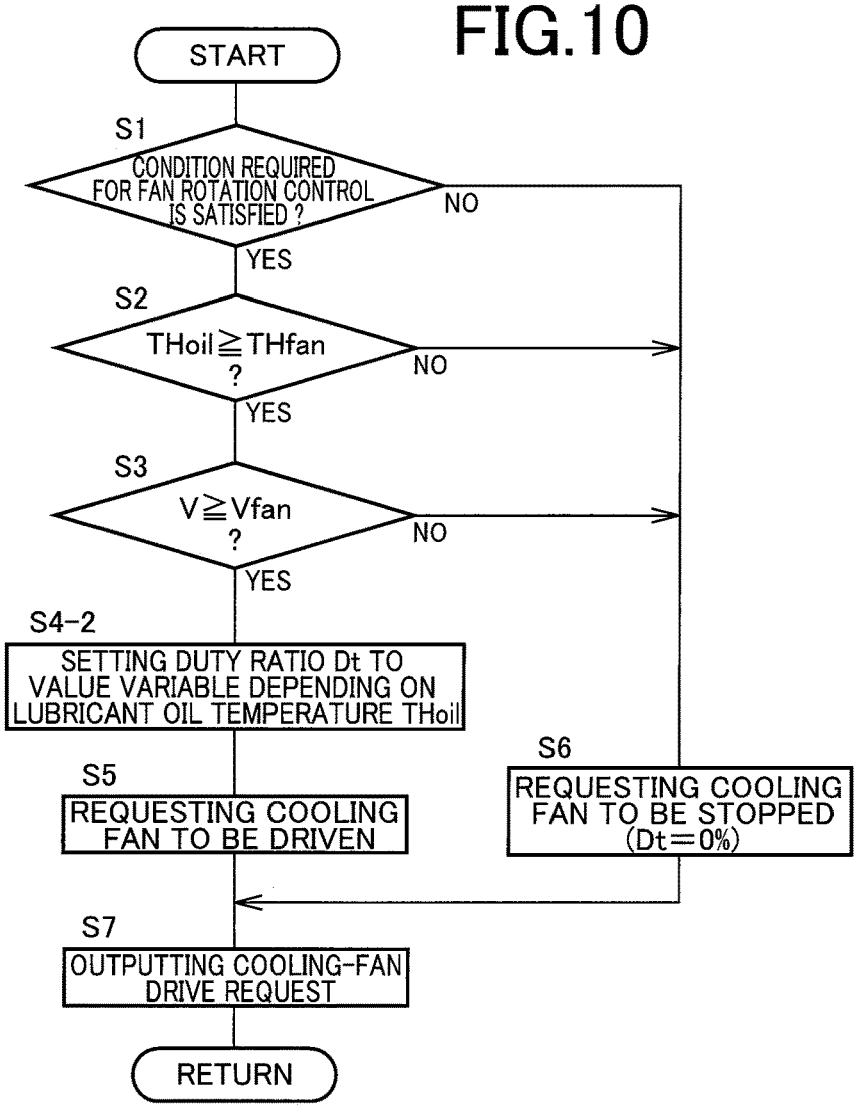
FIG. 10 is a flow chart for explaining still another embodiment of the present invention, wherein the flow chart corresponds to the flow chart of FIG. 3.
Figure 11:
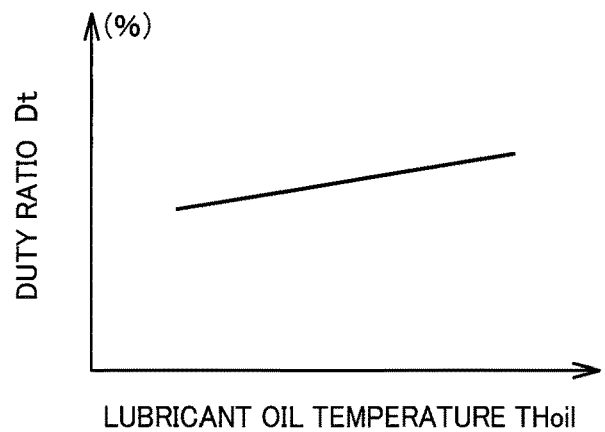
FIG. 11 shows, by way of example, a map that is to be used to set the TM duty ratio Dt to a value variable depending on a lubricant oil temperature THoil at step S4-2 in a control routine shown in FIG. 10.

FIG. 10 is a flow chart for a control routine that is to be executed, in place of the control routine shown by the flow chart of FIG. 3, by the TM-cooling-rotation control portion 72. This control routine is different from the control routine shown in FIG. 3 in that step S4-2 is implemented in place of step S4. In this embodiment, at step S4-2, the TM duty ratio Dt, which is the duty ratio of the drive current applied to the cooling fan 58 for cooling the automatic transmission 16, is set to a value variable depending on the lubricant oil temperature THoil, unlike at step S4 at which the TM duty ratio Dt is set to the value variable depending on the engine rotational speed NE. That is, the TM duty ratio Dt is increased with increase of the lubricant oil temperature THoil so as to increase the rotational speed of the cooling fan 58 with increase of the lubricant oil temperature THoil, as shown in a map of FIG. 11, for example. Since the lubricant oil temperature THoil corresponds to the temperature of the automatic transmission 16, it is possible to obtain substantially the same effect as in the above-described embodiments, which is that the automatic transmission 16 is appropriately cooled depending on the temperature of the automatic transmission 16 while the noise generated by the rotation of the cooling fan 58 is suppressed when the temperature of the automatic transmission 16 is relatively low. It is noted that the TM duty ratio Dt may be set to a value continuously variable depending on the lubricant oil temperature THoil, or alternatively, may be set to a value variable in steps such as two or three steps.

It is noted that, in each of the cooling systems 80, 90 shown in FIGS. 6 and 7, respectively, too, a corresponding one of the cooling fans 58, 94 can be controlled by execution of either of the control routines shown in FIGS. 8 and 10.

It is to be understood that the embodiments described above are given for illustrative purpose only, and that the present invention may be embodied with various modifications and improvements which may occur to those skilled in the art.

Nomenclature of Elements

10: vehicle
14: engine (driving prime mover)
16: automatic transmission (power transmission apparatus)
16*c*: engagement devices
22L, 22R: drive wheels
30; 80; 90: cooling system
32: oil circulation circuit
34: refrigerant circulation circuit
40: oil pump
42; 82: oil cooler
50: refrigerant pump
52: radiator
58; 94: cooling fan
60: electronic control apparatus
64: oil temperature sensor (temperature detection device)
70: load limiting portion
72: TM-cooling-rotation control portion (fan-rotation control portion)
74: fan drive portion (fan-rotation control portion)
92: condenser
THoil: lubricant oil temperature (temperature related to power transmission apparatus, detected temperature)
THlim: limit temperature value
THfan: fan-cooling temperature value
NE: engine rotational speed (prime-mover rotational speed, physical quantity)
V: running speed (physical quantity)
Vfan: fan-cooling speed value

What is claimed is:

1. A cooling system for a vehicle that includes a power transmission apparatus and a temperature detection device configured to detect a temperature related to the power transmission apparatus,
the cooling system comprising:
a cooling fan configured to cool the power transmission apparatus; and
an electronic control apparatus including a load limiting portion configured, when the temperature detected by the temperature detection device exceeds a limit temperature value, to limit a load applied to the power transmission apparatus,
wherein the electronic control apparatus includes a fan-rotation control portion configured to determine whether the detected temperature is equal to or higher than a fan-cooling temperature value that is lower than the limit temperature value, and to control rotation of the cooling fan, such that the cooling fan is rotated when the detected temperature is equal to or higher than the fan-cooling temperature value, and such that a rotational speed of the cooling fan is higher when a temperature of the power transmission apparatus is high, than when the temperature of the power transmission apparatus is low,
wherein the fan-rotation control portion is configured to control the rotation of the cooling fan, based on the detected temperature or a physical quantity that influences the temperature of the power transmission apparatus, such that the rotational speed of the cooling fan is higher when the temperature of the power transmission apparatus is high, than when the temperature of the power transmission apparatus is low,
wherein the power transmission apparatus is configured to transmit an output of a driving prime mover provided in the vehicle, to drive wheels of the vehicle, and
wherein the fan-rotation control portion is configured to control the rotation of the cooling fan, depending on the physical quantity in the form of a running speed of the vehicle or a prime-mover rotational speed that is a rotational speed of the driving prime mover, such that the rotational speed of the cooling fan is higher when the running speed or the prime-mover rotational speed is high, than when the running speed or the prime-mover rotational speed is low.

2. A cooling system for a vehicle that includes a power transmission apparatus and a temperature detection device configured to detect a temperature related to the power transmission apparatus,
the cooling system comprising:
a cooling fan configured to cool the power transmission apparatus; and
an electronic control apparatus including a load limiting portion configured, when the temperature detected by the temperature detection device exceeds a limit temperature value, to limit a load applied to the power transmission apparatus,
wherein the electronic control apparatus includes a fan-rotation control portion configured to determine whether the detected temperature is equal to or higher than a fan-cooling temperature value that is lower than the limit temperature value, and to control rotation of the cooling fan, such that the cooling fan is rotated when the detected temperature is equal to or higher than the fan-cooling temperature value, and such that a rotational speed of the cooling fan is higher when a temperature of the power transmission apparatus is high, than when the temperature of the power transmission apparatus is low, and wherein the cooling fan is configured to reduce an atmospheric temperature around the power transmission apparatus, by blowing outside air to the power transmission apparatus.

3. The cooling system according to claim 2, wherein the vehicle includes an internal combustion engine as the driving prime mover, wherein the power transmission apparatus is an automatic transmission which is disposed adjacent to the engine in a width direction of the vehicle, and which is configured to transmit rotation of the engine to drive wheels of the vehicle at a variable gear ratio, wherein the temperature detection device is configured to detect, as the temperature related to the power transmission apparatus, a transmission lubricant temperature that is a temperature of a lubricant oil of the automatic transmission, wherein the automatic transmission is provided with an oil circulation circuit that includes an oil pump configured to circulate the lubricant oil in the oil circulation circuit and an oil cooler configured to cool the lubricant oil by heat exchange, wherein the engine is provided with a refrigerant circulation circuit that includes a refrigerant pump configured to circulate a refrigerant in the refrigerant circulation circuit and a radiator disposed on a front side of the engine in a running direction of the vehicle so as to cool the refrigerant by outside air, and wherein the cooling fan is disposed on a front side of the radiator in the running direction of the vehicle so as to reduce the atmospheric temperature of the automatic transmission by blowing the outside air to the automatic transmission as well as to the radiator.

4. The cooling system according to claim 3, wherein the refrigerant circulation circuit is connected to the oil cooler such that the lubricant oil is cooled by the refrigerant through the oil cooler.

5. The cooling system according to claim 2, wherein a condenser of an air conditioner is disposed on a front side of the power transmission apparatus in a running direction of the vehicle, and wherein the cooling fan is disposed on a front side of the condenser in the running direction of the vehicle so as to reduce the atmospheric temperature of the automatic transmission by blowing outside air to the automatic transmission as well as to the condenser.

6. The cooling system according claim 2, wherein the power transmission apparatus includes engagement devices each of which is to be engaged and released, and wherein the load limiting portion is configured, when the detected temperature exceeds the limit temperature value, to limit a load applied to the engagement devices.

7. A cooling system for a vehicle that includes a power transmission apparatus and a temperature detection device configured to detect a temperature related to the power transmission apparatus, the cooling system comprising:

a cooling fan configured to cool the power transmission apparatus; and an electronic control apparatus including a load limiting portion configured, when the temperature detected by the temperature detection device exceeds a limit temperature value, to limit a load applied to the power transmission apparatus, wherein the electronic control apparatus includes a fan-rotation control portion configured to determine whether the detected temperature is equal to or higher than a fan-cooling temperature value that is lower than the limit temperature value, and to control rotation of the cooling fan, such that the cooling fan is rotated when the detected temperature is equal to or higher than the fan-cooling temperature value, and such that a rotational speed of the cooling fan is higher when a temperature of the power transmission apparatus is high, than when the temperature of the power transmission apparatus is low, and wherein the fan-rotation control portion is configured to determine whether a running speed of the vehicle is equal to or higher than a fan-cooling speed value, and wherein the fan-rotation control portion is configured to control the rotation of the cooling fan when the running speed is equal to or higher than the fan-cooling speed value, and to stop the rotation of the cooling fan when the running speed is lower than the fan-cooling speed value.

8. The cooling system according to claim 7, wherein the vehicle includes an internal combustion engine as the driving prime mover, wherein the power transmission apparatus is an automatic transmission which is disposed adjacent to the engine in a width direction of the vehicle, and which is configured to transmit rotation of the engine to drive wheels of the vehicle at a variable gear ratio, wherein the temperature detection device is configured to detect, as the temperature related to the power transmission apparatus, a transmission lubricant temperature that is a temperature of a lubricant oil of the automatic transmission, wherein the automatic transmission is provided with an oil circulation circuit that includes an oil pump configured to circulate the lubricant oil in the oil circulation circuit and an oil cooler configured to cool the lubricant oil by heat exchange, wherein the engine is provided with a refrigerant circulation circuit that includes a refrigerant pump configured to circulate a refrigerant in the refrigerant circulation circuit and a radiator disposed on a front side of the engine in a running direction of the vehicle so as to cool the refrigerant by outside air, and wherein the cooling fan is disposed on a front side of the radiator in the running direction of the vehicle so as to reduce the atmospheric temperature of the automatic transmission by blowing the outside air to the automatic transmission as well as to the radiator.

9. The cooling system according to claim 8, wherein the refrigerant circulation circuit is connected to the oil cooler such that the lubricant oil is cooled by the refrigerant through the oil cooler.

10. The cooling system according to claim 7, wherein a condenser of an air conditioner is disposed on a front side of the power transmission apparatus in a running direction of the vehicle, and wherein the cooling fan is disposed on a front side of the condenser in the running direction of the vehicle so as to reduce the atmospheric temperature of the automatic transmission by blowing outside air to the automatic transmission as well as to the condenser.

11. The cooling system according claim 7,
wherein the power transmission apparatus includes engagement devices each of which is to be engaged and released, and
wherein the load limiting portion is configured, when the detected temperature exceeds the limit temperature value, to limit a load applied to the engagement devices.

12. The cooling system according to claim 1,
wherein the vehicle includes an internal combustion engine as the driving prime mover,
wherein the power transmission apparatus is an automatic transmission which is disposed adjacent to the engine in a width direction of the vehicle, and which is configured to transmit rotation of the engine to drive wheels of the vehicle at a variable gear ratio,
wherein the temperature detection device is configured to detect, as the temperature related to the power transmission apparatus, a transmission lubricant temperature that is a temperature of a lubricant oil of the automatic transmission,
wherein the automatic transmission is provided with an oil circulation circuit that includes an oil pump configured to circulate the lubricant oil in the oil circulation circuit and an oil cooler configured to cool the lubricant oil by heat exchange,
wherein the engine is provided with a refrigerant circulation circuit that includes a refrigerant pump configured to circulate a refrigerant in the refrigerant circulation circuit and a radiator disposed on a front side of the engine in a running direction of the vehicle so as to cool the refrigerant by outside air, and
wherein the cooling fan is disposed on a front side of the radiator in the running direction of the vehicle so as to reduce the atmospheric temperature of the automatic transmission by blowing the outside air to the automatic transmission as well as to the radiator.

13. The cooling system according to claim 12,
wherein the refrigerant circulation circuit is connected to the oil cooler such that the lubricant oil is cooled by the refrigerant through the oil cooler.

14. The cooling system according to claim 1,
wherein a condenser of an air conditioner is disposed on a front side of the power transmission apparatus in a running direction of the vehicle, and
wherein the cooling fan is disposed on a front side of the condenser in the running direction of the vehicle so as to reduce the atmospheric temperature of the automatic transmission by blowing outside air to the automatic transmission as well as to the condenser.

15. The cooling system according to claim 1,
wherein the power transmission apparatus includes engagement devices each of which is to be engaged and released, and
wherein the load limiting portion is configured, when the detected temperature exceeds the limit temperature value, to limit a load applied to the engagement devices.

* * * * *